United States Patent
Yasui

(10) Patent No.: US 12,217,473 B2
(45) Date of Patent: Feb. 4, 2025

(54) OBJECT DETECTION DEVICE, OBJECT DETECTION METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 294 days.

(21) Appl. No.: 17/702,828

(22) Filed: Mar. 24, 2022

(65) Prior Publication Data
US 2022/0319147 A1 Oct. 6, 2022

(30) Foreign Application Priority Data
Mar. 31, 2021 (JP) ................. 2021-060571

(51) Int. Cl.
*G06V 10/44* (2022.01)
*G06V 10/20* (2022.01)
(Continued)

(52) U.S. Cl.
CPC .............. *G06V 10/44* (2022.01); *G06V 10/25* (2022.01); *G06V 10/255* (2022.01); *G06V 20/58* (2022.01); *G06V 20/588* (2022.01)

(58) Field of Classification Search
USPC .......................................................... 382/195
See application file for complete search history.

(56) References Cited

U.S. PATENT DOCUMENTS

| 6,754,369 B1 | 6/2004 | Sazawa |
| 2015/0281594 A1* | 10/2015 | Sakaniwa ................. G06T 5/94 |
| | | 348/218.1 |

(Continued)

FOREIGN PATENT DOCUMENTS

| CN | 101803389 | 8/2010 |
| CN | 111133471 | 5/2020 |

(Continued)

OTHER PUBLICATIONS

Japanese Office Action for Japanese Patent Application No. 2021-060571 mailed Oct. 22, 2024.

(Continued)

*Primary Examiner* — Jacky X Zheng
(74) *Attorney, Agent, or Firm* — Amin, Turocy & Watson, LLP

(57) ABSTRACT

An object detection device includes a storage device which has stored a program, and a hardware processor, in which the hardware processor executes the program stored in the storage device, thereby acquiring a captured image in which a road is captured, generating a low-resolution image in which an image quality of the captured image is lowered, defining one or more partial area sets with each of the one or more partial area sets defined by cutting out a plurality of partial areas from the low-resolution image, deriving an aggregated value obtained by aggregating differences in feature amount between the partial areas included in each of the one or more partial area set and the peripheral partial areas, and extracting a point of interest based on the aggregated value.

7 Claims, 7 Drawing Sheets

(51) Int. Cl.
    *G06V 10/25*    (2022.01)
    *G06V 20/56*    (2022.01)
    *G06V 20/58*    (2022.01)

(56) References Cited

U.S. PATENT DOCUMENTS

| | | |
|---|---|---|
| 2019/0149752 A1 | 5/2019 | Takahashi et al. |
| 2020/0097740 A1* | 3/2020 | Hashimoto ............... G06T 7/70 |
| 2020/0279166 A1 | 9/2020 | Yamada et al. |
| 2024/0104936 A1* | 3/2024 | Tsuchiya ................ G06V 10/25 |

FOREIGN PATENT DOCUMENTS

| | | |
|---|---|---|
| JP | 2001-028746 | 1/2001 |
| JP | 2001-273461 | 10/2001 |
| JP | 2014-153866 | 8/2014 |
| JP | 2018-107759 | 7/2018 |
| JP | 2019-124986 | 7/2019 |
| WO | 2009/035012 | 3/2009 |

OTHER PUBLICATIONS

Chinese Office Action for Chinese Patent Application No. 202210139712.6 mailed Nov. 22, 2024.

\* cited by examiner

*FIG. 5*

| GRID 2 (UPPER LEFT GRID) | GRID 3 (UPPER GRID) | GRID 4 (UPPER RIGHT GRID) |
|---|---|---|
| GRID 5 (LEFT GRID) | GRID 1 (GRID OF INTEREST) | GRID 6 (RIGHT GRID) |
| GRID 7 (LOWER LEFT GRID) | GRID 8 (LOWER GRID) | GRID 9 (LOWER RIGHT GRID) |

*FIG. 6*

| COMPARISON DESTINATION GRID | COMPARISON SOURCE GRID | |
|---|---|---|
| GRID 1 | GRID 3 | VERTICAL COMPARISON |
| GRID 1 | GRID 8 | |
| GRID 1 | GRID 5 | HORIZONTAL COMPARISON |
| GRID 1 | GRID 6 | |
| GRID 1 | GRID 2 | DIAGONAL COMPARISON |
| GRID 1 | GRID 4 | |
| GRID 1 | GRID 7 | |
| GRID 1 | GRID 9 | |

*FIG. 7*

| COMPARISON DESTINATION GRID | COMPARISON SOURCE GRID | |
|---|---|---|
| GRID 1 | GRID 3 | ⎫ VERTICAL COMPARISON |
| GRID 1 | GRID 8 | ⎭ |
| GRID 1 | GRID 5 | ⎫ HORIZONTAL COMPARISON |
| GRID 1 | GRID 6 | ⎭ |
| GRID 1 | GRID 2 | ⎫ |
| GRID 1 | GRID 4 | ⎪ DIAGONAL COMPARISON |
| GRID 1 | GRID 7 | ⎪ |
| GRID 1 | GRID 9 | ⎭ |
| GRID 3 | GRID 8 | ··· COMPARISON BETWEEN TOP AND BOTTOM |
| GRID 5 | GRID 6 | ··· COMPARISON BETWEEN RIGHT AND LEFT |
| GRID 2 | GRID 9 | ··· COMPARISON BETWEEN UPPER LEFT AND LOEWR RIGHT |
| GRID 4 | GRID 7 | ··· COMPARISON BETWEEN UPPER RIGHT AND LOWER LEFT |

OBJECT DETECTION DEVICE, OBJECT DETECTION METHOD, AND STORAGE MEDIUM

CROSS-REFERENCE TO RELATED APPLICATION

Priority is claimed on Japanese Patent Application No. 2021-060571, filed Mar. 31, 2021, the content of which is incorporated herein by reference.

BACKGROUND

Field of the Invention

The present invention relates to an object detection device, an object detection method, and a storage medium.

Description of Related Art

Conventionally, a traveling obstacle detection system of an invention that divides the area of an object in a monitoring area such as on a road obtained by photographing into blocks, extracts local feature amounts for each block, and determines the presence or absence of an obstacle based on the extracted local feature amounts has been disclosed (Japanese Unexamined Patent Application, First Publication No. 2019-124986).

SUMMARY

In the conventional technology, the processing load may become excessive or the accuracy may not be sufficient in some cases.

The present invention has been made in consideration of such circumstances, and an object of the present invention is to provide an object detection device, an object detection method, and a storage medium capable of detecting an object while reducing the processing load.

The object detection device, object detection method, and storage medium according to the present invention have adopted the following configurations.

(1): An object detection device according to one aspect of the present invention includes a storage device storing a program, and a hardware processor, in which the hardware processor executes the program stored in the storage device to: acquire a captured image in which a road is captured, generate a low-resolution image in which an image quality of the captured image is lowered, define one or more partial area sets with each of the one or more partial area sets defined by cutting out a plurality of partial areas from the low-resolution image, derive an aggregated value obtained by aggregating differences in feature amount between the partial areas included in each of the one or more partial area set and the peripheral partial areas, and extracting a point of interest based on the aggregated value.

(2): In the aspect of (1) described above, the hardware processor defines the plurality of partial area sets such that the number of pixels in the partial areas differs from each other between the plurality of partial area sets, and extracts the point of interest by adding the aggregated value for each pixel between the plurality of partial area sets.

(3): In the aspect of (1) described above, the hardware processor derives the aggregated value by aggregating differences in feature amount between the partial areas included in each of the one or more partial area sets and the other partial areas adjacent vertically, horizontally, and diagonally.

(4): In the aspect of (3) described above, the hardware processor further adds a difference in feature amount between the partial areas vertically adjacent, a difference in feature amount between the partial areas horizontally adjacent, and a difference in feature amount between the partial areas diagonally adjacent for the partial areas included in each of the one or more partial area sets to the aggregated value.

(5): In the aspect of (1) described above, the hardware processor determines whether an object on a road is an object that an mobile object needs to avoid contact with by performing high-resolution processing on the point of interest in the captured image.

(6): An object detection method according to another aspect of the present invention is an object detection method executed using a computer, and includes acquiring a captured image in which a road is captured, generating a low-resolution image in which an image quality of the captured image is lowered, defining one or more partial area sets with each of the one or more partial area sets defined by cutting out a plurality of partial areas from the low-resolution image, and deriving an aggregated value obtained by aggregating differences in feature amount between the partial areas included in each of the one or more partial area set and the peripheral partial areas, and extracting a point of interest based on the aggregated value.

(7): A storage medium according to still another aspect of the present invention is a computer-readable non-transitory storage medium that has stored a program causing a computer to: acquire a captured image in which a road is captured; generate a low-resolution image in which an image quality of the captured image is lowered; define one or more partial area sets with each of the one or more partial area sets defined by cutting out a plurality of partial areas from the low-resolution image, and derive an aggregated value obtained by aggregating differences in feature amount between the partial areas included in each of the one or more partial area set and the peripheral partial areas, and extracting a point of interest based on the aggregated value.

According to (1) to (7) described above, it is possible to detect an object while reducing a processing load.

According to the aspect of (2) described above, it is possible to further improve a robustness of detection performance against a variation in size of an object reflected in the point of interest.

BRIEF DESCRIPTION OF THE DRAWINGS

FIG. 5 is a diagram which shows a definition example of a peripheral grid.

FIG. 6 is a diagram which shows an example of a rule for selecting a comparison destination grid and a comparison source grid.

FIG. 7 is a diagram which shows another example of the rule for selecting a comparison destination grid and a comparison source grid.

DESCRIPTION OF EMBODIMENTS

Hereinafter, an embodiment of an object detection device, an object detection method, and a storage medium of the present invention will be described with reference to the drawings. The object detection device is, for example, mounted on a mobile object. The mobile object is, for example, a four-wheeled vehicle, a two-wheeled vehicle, a micromobility, or a robot that moves by itself, or a portable device such as a smartphone placed on a mobile object that moves by itself or moving by being carried by a person. In the following description, it is assumed that the mobile object is a four-wheeled vehicle, and the mobile object is referred to as a "vehicle" for the following description. The object detection device is not limited to a device mounted on the mobile object, and may perform processing to be described below based on a captured image captured by a camera for fixed point observation or a camera of a smartphone.

Figure 1:
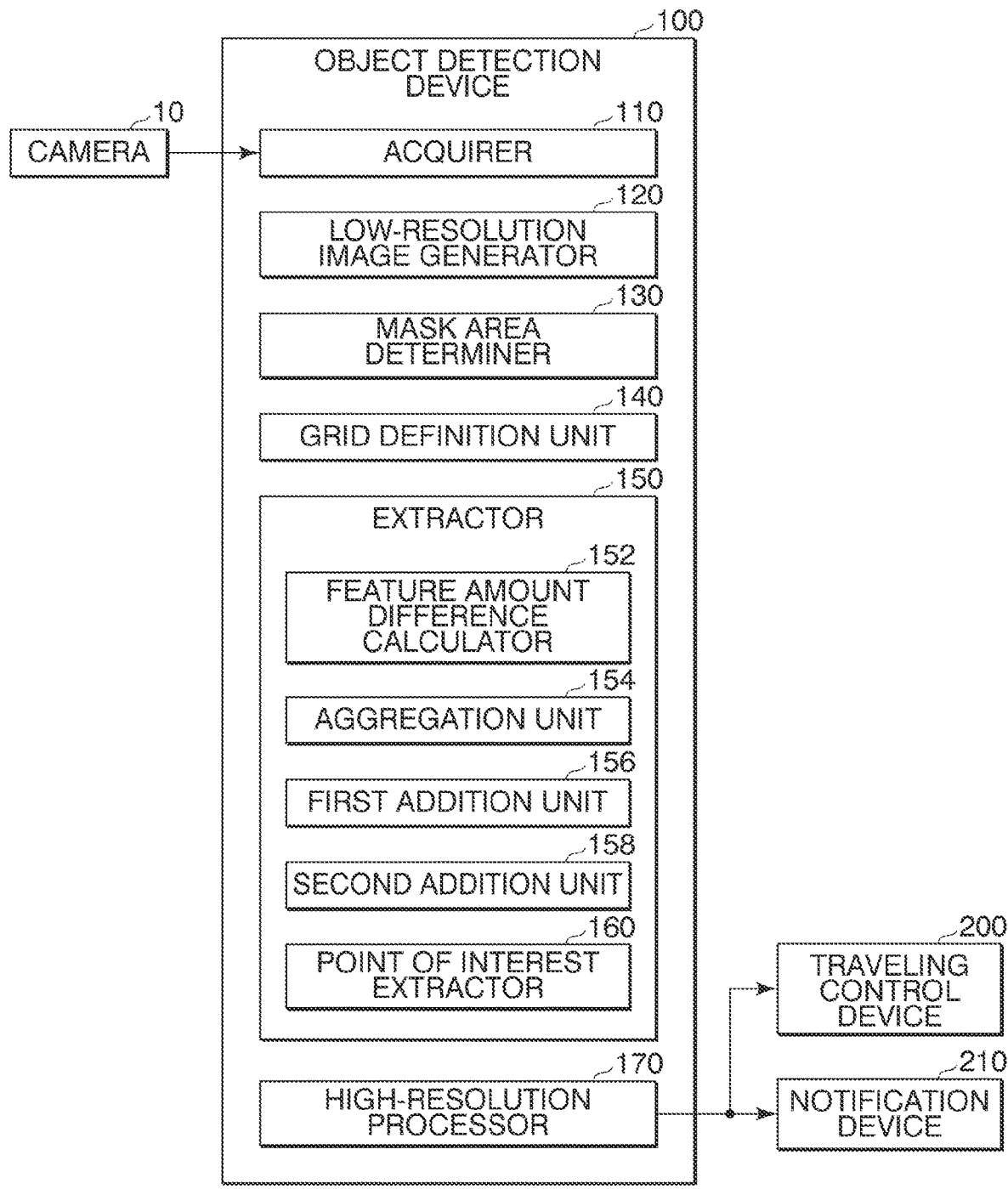
FIG. 1 is a diagram which shows a configuration of an object detection device and an example of peripheral devices.

FIG. 1 is a diagram which shows a configuration of an object detection device 100 and an example of peripheral devices. The object detection device 100 communicates with a camera 10, a traveling control device 200, a notification device 210, and the like.

The camera 10 is attached to a back surface of a windshield of a vehicle, captures at least an image in which a road is captured in a traveling direction of the vehicle, and outputs the captured image to the object detection device 100. A sensor fusion device or the like may be interposed between the camera 10 and the object detection device 100, but description thereof will be omitted.

The traveling control device 200 is, for example, an automatic driving control device for causing a vehicle to autonomously travel, or a driving support device for performing inter-vehicle distance control, automatic brake control, automatic lane change control, and the like. The notification device 210 is a speaker, a vibrator, a light emitting device, a display device, or the like for outputting information to an occupant of the vehicle.

The object detection device 100 includes, for example, an acquirer 110, a low-resolution image generator 120, a grid definition unit 140, an extractor 150, and a high-resolution processor 170. The extractor 150 includes a feature amount difference calculator 152, an aggregation unit 154, a first addition unit 156, a second addition unit 158, and a point of interest extractor 160. These components are realized by, for example, a hardware processor such as a central processor (CPU) executing a program (software). Some or all of these components may be realized by hardware (circuit part; including circuitry) such as large scale integration (LSI), an application specific integrated circuit (ASIC), a field-programmable gate array (FPGA), or a graphics processor (GPU), or may be realized by software and hardware in cooperation. A program may be stored in advance in a storage device (a storage device having a non-transitory storage medium) such as a hard disk drive (HDD) or a flash memory, or may be stored in a removable storage medium (non-transitory storage medium) such as a DVD or a CD-ROM and installed by the storage medium being mounted on a drive unit.

Figure 2:
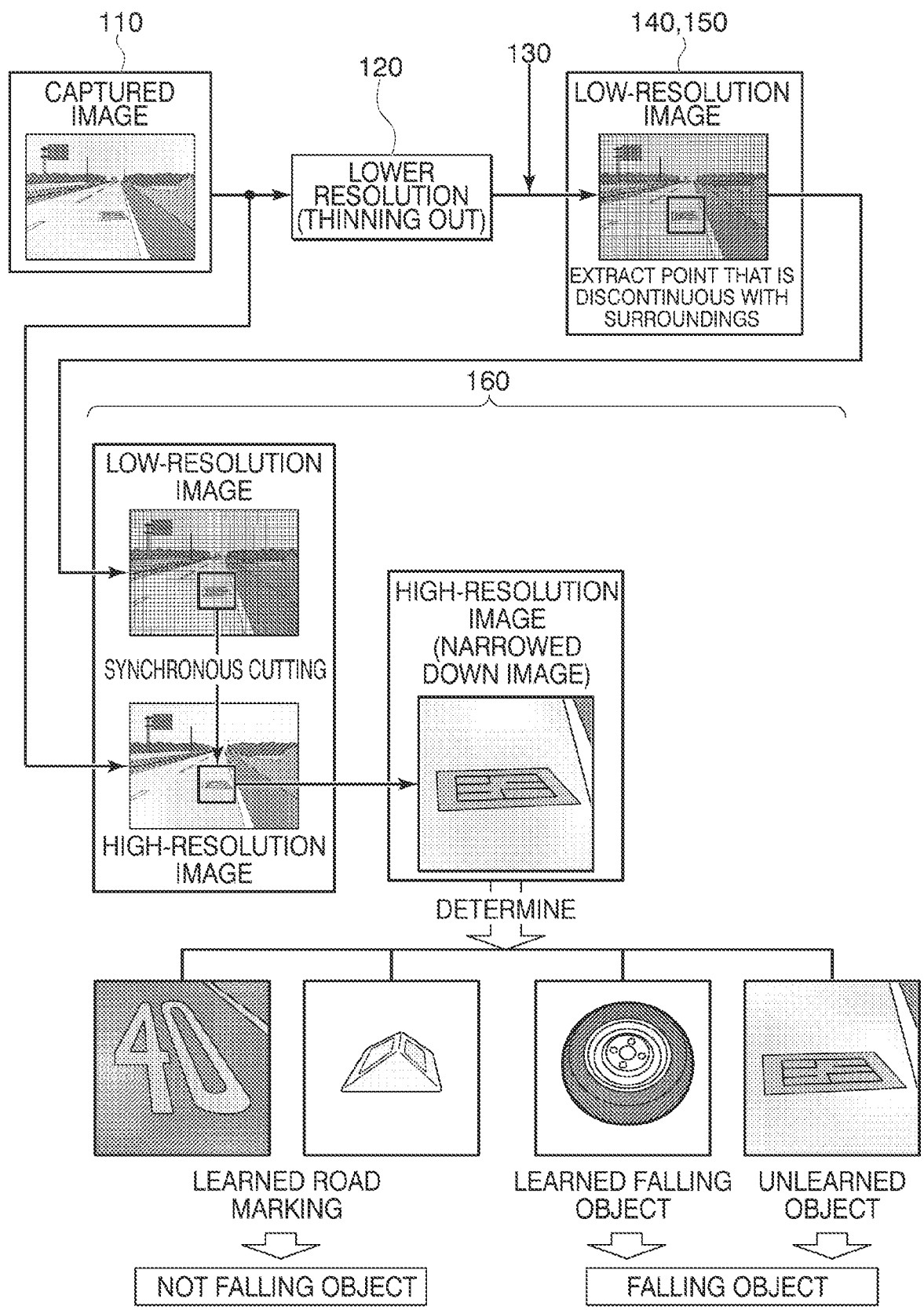
FIG. 2 is a diagram which schematically shows functions of each part of the object detection device.

FIG. 2 is a diagram which schematically shows functions of each part of the object detection device 100. In the following description, each part of the object detection device 100 will be described with reference to FIG. 2. The acquirer 110 acquires a captured image from the camera 10. The acquirer 110 stores the acquired captured image (data thereof) in a working memory such as a random access memory (RAM).

The low-resolution image generator 120 performs thinning processing on the captured image to generate a low-resolution image whose image quality is lower than that of the captured image. The low-resolution image is, for example, an image having the number of pixels smaller than that of the captured image.

The mask area determiner 130 determines a mask area that is not processed by the grid definition unit 140 and subsequent constituents. Details will be described below.

The grid definition unit 140 defines a plurality of partial area sets in a low-resolution image. Each of the plurality of partial area sets is defined by cutting out a plurality of partial areas (hereinafter referred to as grids) from a low-resolution image. A partial area is set, for example, in a rectangular shape without a gap. The grid definition unit 140 defines the plurality of partial area sets so that the number of pixels in the grids differs between the plurality of partial area sets. In the following description, each of the plurality of partial area sets may be referred to as a first partial area set PA1, a second partial area set PA2, ..., and a $k^{th}$ partial area set PAk. Detailed functions of the grid definition unit 140 will be described below.

The extractor 150 derives an aggregated value obtained by aggregating a difference in feature amount between grids included in each of the plurality of partial area sets and the peripheral grids, and adds an aggregated value between the plurality of partial area sets to extract a point of interest (a point that is discontinuous with the surroundings in FIG. 2). Detailed functions of each part of the extractor 150 will be described below.

The high-resolution processor 170 cuts out a portion corresponding to the point of interest in the captured image (synchronous cutting in FIG. 2), performs high-resolution processing on it, and determines whether an object on a road is an object that a vehicle needs to avoid contact with. The high-resolution processor 170 determines whether an image reflected in the point of interest is a road marking, a falling object, or an unknown object (an unlearned object), by using, for example, a learned model that recognizes road markings (an example of an object that a vehicle does not have to avoid contact with) and falling objects (an example of an object that a vehicle needs to avoid contact) from an image. At this time, the high-resolution processor 170 may further narrow down the processing to the portion recognized to correspond to a road marking or a falling object in the point of interest in the captured image.

Figure 3:
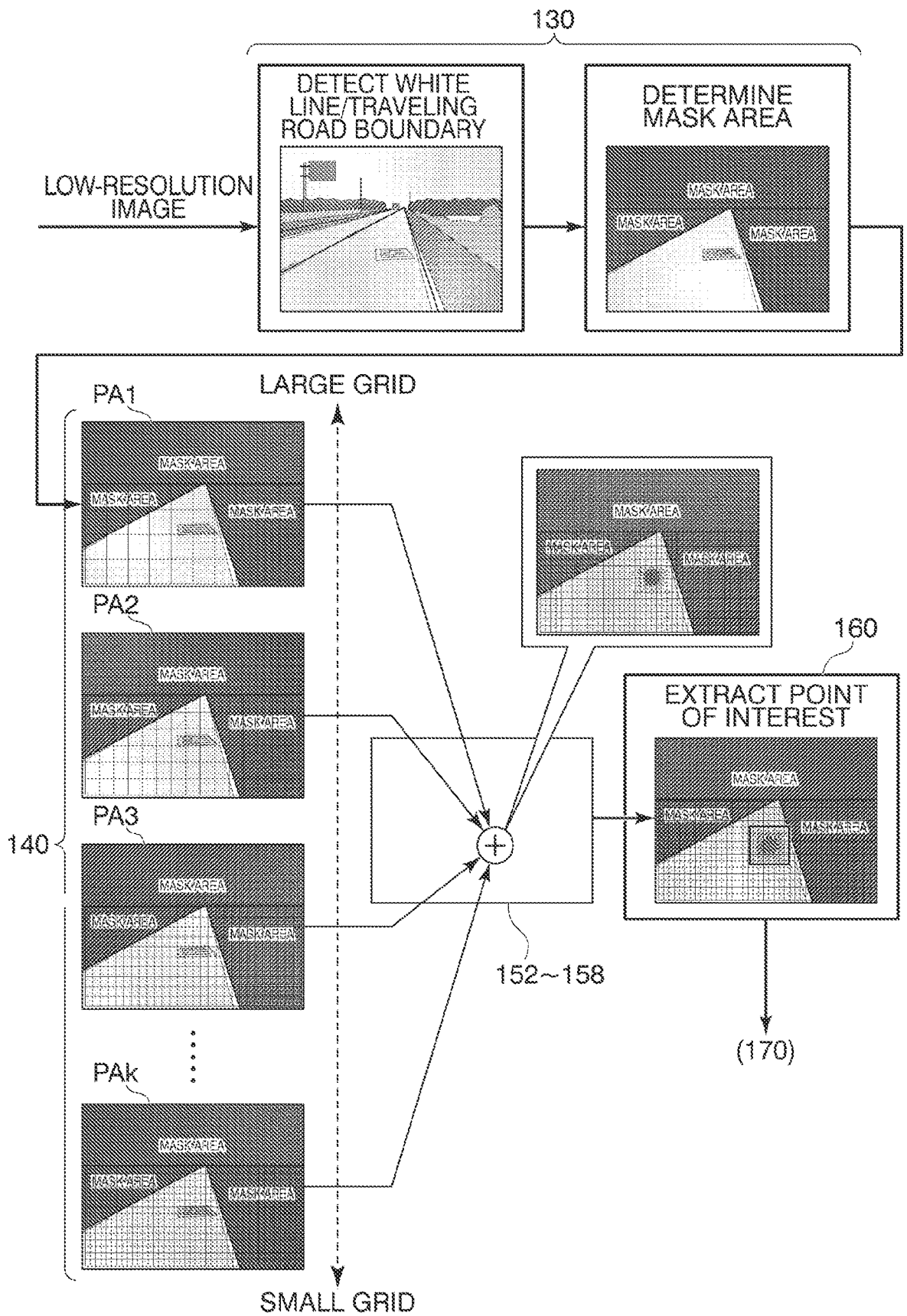
FIG. 3 is a diagram for describing processing of a mask area determiner, a grid definition unit, and an extractor.

FIG. 3 is a diagram for describing processing of the mask area determiner 130, the grid definition unit 140, and the extractor 150. For example, the mask area determiner 130 extracts edge points in a right and left direction in a low-resolution image, and detects a position in an image of a road lane marking, a road shoulder, or the like (white line, traveling road boundary) by connecting the edge points arranged in a straight line. Then, it detects an area sandwiched between the right and left road lane markings and the like and including a center point in the right and left direction on a front side of the image as a traveling road of the vehicle. Next, the mask area determiner 130 determines portions other than the traveling road of the vehicle (a portion above a vanishing point where the road lane markings intersect in the distance, and portions closer to the left and right ends than the road lane markings) as a mask area. The grid definition unit 140 and the extractor 150 perform processing by excluding the mask area.

As described above, the grid definition unit 140 defines the partial area sets in the following order from the first partial area set PA1 having the largest number of pixels in the grids, the second partial area set PA2 having the second largest number of pixels in the grids, and up to the $k^{th}$ partial area set PAk having the smallest number of pixels in the grids. "Define" is to determine a boundary line of the grids for a low-resolution image.

In the following description, processing of the feature amount difference calculator 152, the aggregation unit 154, and the first addition unit 156 will be described. The processing of these functional units described with reference to FIGS. 4 to 7 is performed after one partial area set is first selected and a grid of interest is selected one by one in the selected partial area set. Then, when all the grids of a selected partial area set are selected as the grids of interest and the processing is completed, a next partial area set is selected and the processing is performed in the same manner. When the processing for all the partial area sets is completed, the second addition unit 158 adds an aggregated value (a second aggregated value V2 described below) between the partial area sets to generate extraction target data PT which is one image, and passes it to the point of interest extractor 160.

Figure 4:
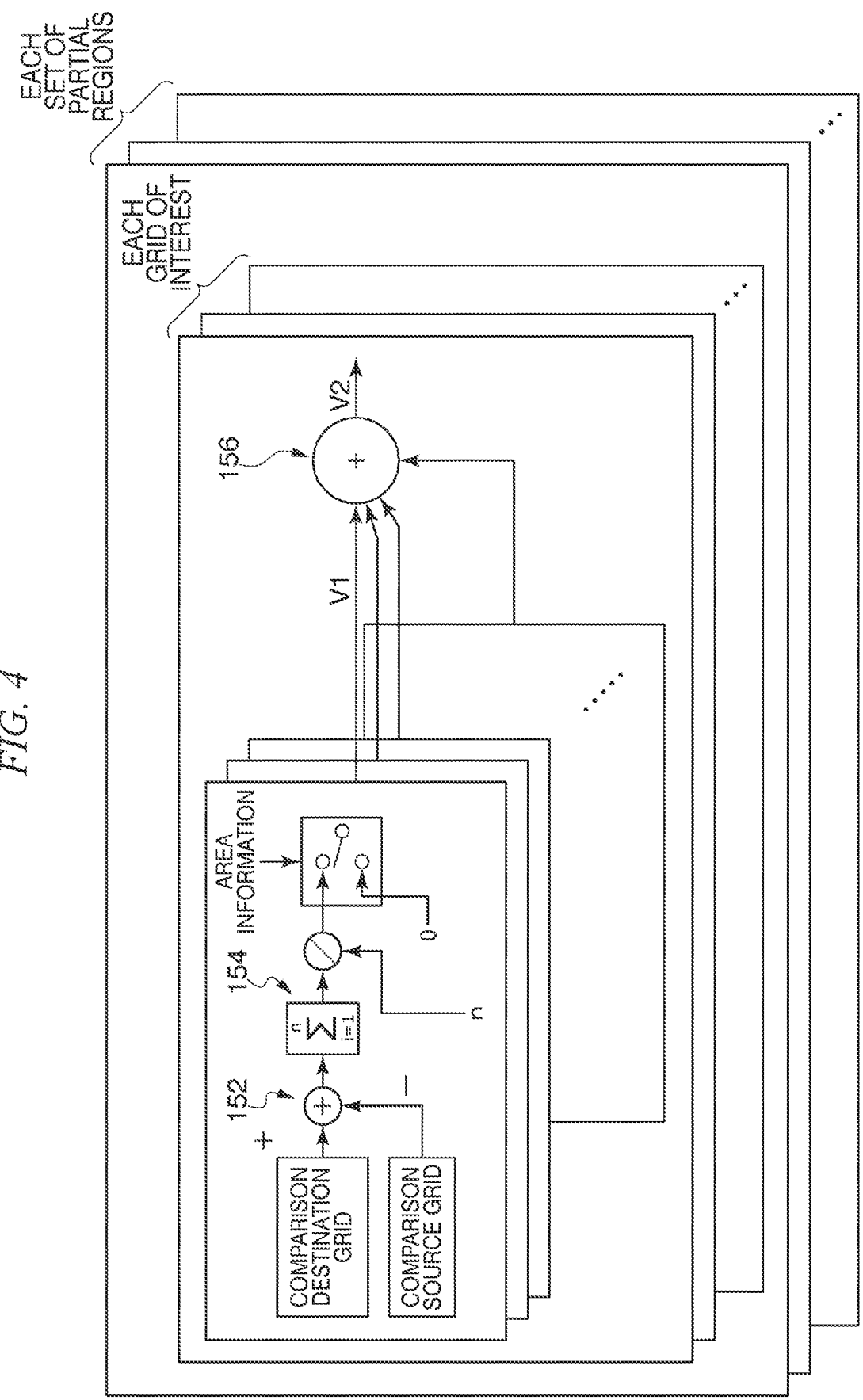
FIG. 4 is a diagram for describing processing of a feature amount difference calculator, an aggregation unit, and a first addition unit.

FIG. 4 is a diagram for describing the processing of the feature amount difference calculator 152, the aggregation unit 154, and the first addition unit 156. The feature amount difference calculator 152 calculates a difference in feature amount for each pixel of a comparison destination grid and a comparison source grid. It is assumed that the feature amount is, for example, a luminance value for each of R, G, and B components, and a set of R, G, and B is one pixel. The comparison destination grid and the comparison source grid are selected from the grid of interest and peripheral grids. FIG. 5 is a diagram which shows a definition example of peripheral grids. As shown in FIG. 5, grids 2 to 9 adjacent to each other in vertical, horizontal, and diagonal directions of the grid of interest are defined as peripheral grids. A method of selecting peripheral grids is not limited to this, and grids on the top, bottom, left, and right may be selected as the peripheral grids, or the peripheral grids may be selected using another rule.

The comparison destination grid and the comparison source grid are, for example, selected in order in a combination shown in FIG. 6. FIG. 6 is a diagram which shows an example of a rule for selecting a comparison destination grid and a comparison source grid. The comparison destination grid is the grid of interest, and the comparison source grid is selected in order from the grids 2 to 9. A relationship between the comparison destination grid and the comparison source grid may be reversed. Then, the aggregation unit 154 obtains a total of differences in feature amount for each pixel and divides it by the number of pixels n in the grids to calculate a first aggregated value V1. The first aggregated value V1 is replaced with zero and output when the grid of interest corresponds to a mask area. That is, the feature amount difference calculator 152, the aggregation unit 154, and the first addition unit 156 execute processing with a grid 1 as a comparison destination grid and a grid 3 as a comparison source grid, processing with the grid 1 as a comparison destination grid and a grid 8 as a comparison source grid, processing with the grid 1 as a comparison destination grid and a grid 5 as a comparison source grid, processing with the grid 1 as a comparison destination grid and a grid 6 as a comparison source grid, processing with the grid 1 as a comparison destination grid and a grid 2 as a comparison source grid, processing with the grid 1 as a comparison destination grid and a grid 4 as a comparison source grid, processing with the grid 1 as a comparison destination grid and a grid 7 as a comparison source grid, and processing with the grid 1 as a comparison destination grid and a grid 9 as a comparison source grid in parallel or sequentially.

A comparison destination grid and a comparison source grid may be selected in order in a combination shown in FIG. 7. FIG. 7 is a diagram which shows another example of the rule for selecting a comparison destination grid and a comparison source grid. A combination of a comparison destination grid and a comparison source grid is not limited to a combination of the grid of interest and peripheral grids, and may include combinations of peripheral grids (especially combinations of an upper grid and a lower grid, a left grid and a right grid, an upper left grid and a lower right grid, and an upper right grid and a lower left grid).

More specifically, a method of calculating the differences in feature amount will be described. As the method of calculating the differences in feature amount, for example, the following patterns 1 to 4 can be considered. In the following description, identification numbers of pixels in each of a comparison destination grid and a comparison source grid are represented by i (i=1 to k; k is the number of pixels in each of the comparison destination grid and the comparison source grid).

(Pattern 1)

The feature amount difference calculator 152 calculates, for example, a difference $\Delta Ri$ in luminance of an R component, a difference $\Delta Gi$ in luminance of a G component, and a difference $\Delta Bi$ in luminance of a B component between pixels at the same position in both a comparison destination grid and a comparison source grid (i=1 to k as described above). Then, it obtains each pixel feature amount $Ppi=\Delta Ri^2+\Delta Gi^2+\Delta Bi^2$ for each pixel, and calculates a maximum value or an average value of each pixel feature amount Ppi as the difference in feature amount between the comparison destination grid and the comparison source grid.

(Pattern 2)

The feature amount difference calculator 152 calculates, for example, a statistical value (refer to an average value, a median value, a mode value, or the like) Raa of the luminance of the R component, a statistical value (the same as above) Gaa of the luminance of the G component, and a statistical value (the same as above) Baa of the luminance of the B component of each pixel in the comparison destination grid, calculates a statistical value (the same as above) Rab of the luminance of the R component, a statistical value (the same as above) Gab of the luminance of the G component, and a statistical value (the same as above) Bab of the luminance of the B component of each pixel in the comparison source grid, and obtains differences $\Delta Ra(=Raa-Rab)$, $\Delta Ga(=Gaa-Gab)$, and $\Delta Ba(=Baa-Bab)$ of these. Then, $\Delta Ra^2+\Delta Ga^2+\Delta Ba^2$, which is a sum of squares of the differences in luminance, or $Max(\Delta Ra^2, \Delta Ga^2, \Delta Ba^2)$, which is a maximum value of the squares of the differences in luminance, as the difference in feature amount between the comparison destination grid and the comparison source grid.

(Pattern 3)

The feature amount difference calculator 152 calculates, for example, a first index value $W1ai$ $(=(R-B)/(R+G+B))$ obtained by dividing a difference in luminance between the R component and the B component by a sum of the luminance of each of the R, G, and B components, and a second index value W2$ai$ (=(R−G)/(R+G+B)) obtained by dividing a difference in luminance between the R component and the G component by the sum of the luminance of each of the R, G, and B components for each pixel i in the comparison destination grid. Moreover, the feature amount difference calculator 152 calculates, for example, a first index value W1$bi$ (=(R−B)/(R+G+B)) obtained by dividing a difference in luminance between the R component and the B component by a sum of the luminance of each of the R, G, and B components, and a second index value W2$bi$ (=(R−G)/(R+G+B)) obtained by dividing a difference in luminance between the R component and the G component by the sum of the luminance of each of the R, G, and B components for each pixel I in the comparison source grid. Next, the feature amount difference calculator 152 calculates each pixel feature amount Ppi=(W1$ai$−W1$bi$)$^2$+(W2$ai$−W2$bi$)$^2$. Then, the feature amount difference calculator 152 calculates a maximum value or an average value of each pixel feature amount Ppi as the difference in feature amount between the comparison destination grid and the comparison source grid. By combining the first index value and the second index value, a balance of the RGB components in each pixel can be expressed. In the same manner as described above, for example, the luminance of each of the R, G, and B components is defined as a size of a vector shifted by 120 degrees, and a vector sum may also be used in the same manner as in the combination of the first index value and the second index value.

(Pattern 4)

The feature amount difference calculator 152 calculates, for example, a statistical value (the same as above) Raa of the luminance of the R component, a statistical value (the same as above) Gaa of the luminance of the G component, and a statistical value (the same as above) Baa of the luminance of the B component of each pixel in the comparison destination grid, and calculates a statistical value (the same as above) Rab of the luminance of the R component, a statistical value (the same as above) Gab of the luminance of the G component, and a statistical value (the same as above) Bab of the luminance of the B component of each pixel in the comparison source grid. Next, the feature amount difference calculator 152 calculates a third index value 3$a$ (=(Raa−Baa)/(Raa+Gaa+Baa)) obtained by dividing a difference between the statistical value Raa of the luminance of the R component and the statistical value Baa of the luminance of the B component by a sum of the statistical values of the luminance of each of the R, G, B components, and a fourth index value W4$a$ (=(Raa−Gaa)/(Raa+Gaa+Baa)) obtained by dividing a difference between the statistical value Raa of the luminance of the R component and the statistical value Gaa of the luminance of the G component by a sum of the statistical values of the luminance of each of the R, G, B components for the comparison destination grid. Similarly, the feature amount difference calculator 152 calculates a third index value 3$b$ (=(Rab−Bab)/(Rab+Gab+Bab)) obtained by dividing a difference between the statistical value Rab of the luminance of the R component and the statistical value Bab of the luminance of the B component by a sum of the statistical values of the luminance of each of the R, G, B components, and a fourth index value W4$b$ (=(Rab−Gab)/(Rab+Gab+Bab)) obtained by dividing a difference between the statistical value Rab of the luminance of the R component and the statistical value Gab of the luminance of the G component by a sum of the statistical values of the luminance of each of the R, G, B components for the comparison source grid. Then, the feature amount difference calculator 152 obtains a difference ΔW3 of the third index value W3$a$ of the comparison destination grid and the third index value W3$b$ of the comparison source grid and a difference ΔW4 of the fourth index value W4$a$ of the comparison destination grid and the fourth index value W4$b$ of the comparison source grid, and calculates a sum ΔW3$^2$+ΔW4$^2$ of the squares of these or maximum values Max (ΔW3$^2$, ΔW4$^2$) of the squares as the difference in feature amount between the comparison destination grid and the comparison source grid.

When an image to be processed is a black-and-white image, the feature amount difference calculator 152 may simply calculate a difference in luminance value as the difference in feature amount between the comparison destination grid and the comparison source grid, and, even when an image to be processed is an RGB image, it may convert the RGB image into a black-and-white image and calculate a difference in orbital value as the difference in feature amount between the comparison destination grid and the comparison source grid.

Returning to FIG. 4, the first addition unit 156 calculates a second aggregated value V2 by adding the first aggregated value V1 obtained corresponding to the grid of interest. The second aggregated value V2 is an example of the "aggregated value" in the claims. When processing of obtaining the second aggregated value V2 is completed while the grid of interest is changed, data in which the second aggregated value V2 is set for all the grids is generated for each partial area set.

Figure 8:
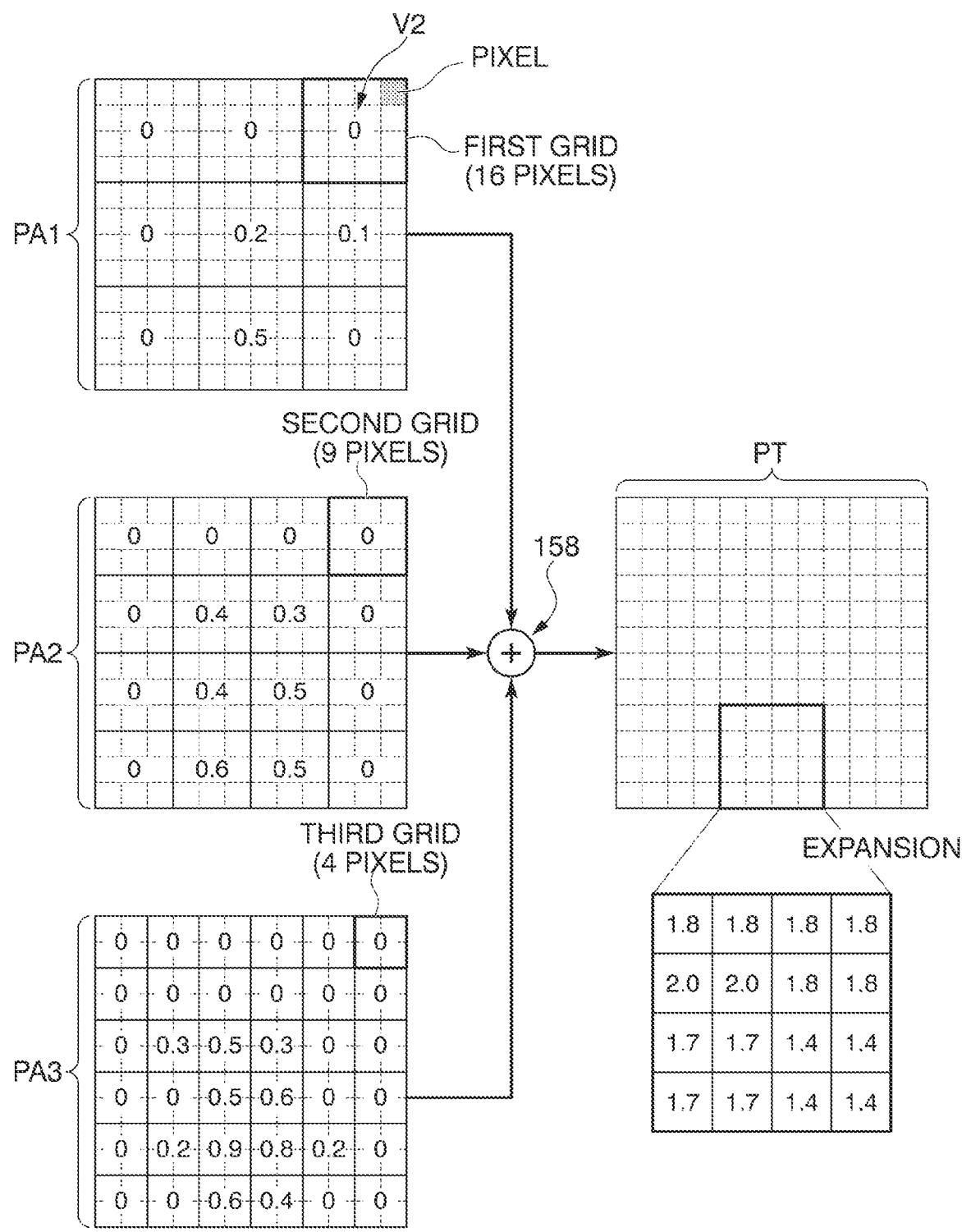
FIG. 8 is a diagram for describing processing of a first addition unit and a second addition unit.

When the data in which the second aggregated value V2 is set for all the grids is generated, the second addition unit 158 adds these data between the partial area sets to generate an extraction target data PT. FIG. 8 is a diagram for describing processing of the first addition unit 156 and the second addition unit 158. In FIG. 8, the smallest rectangle is one pixel of the low-resolution image. Here, for simplification of description, it is assumed that there are three of the first partial area set PA1, the second partial area set PA2, and the third partial area set PA3, and their sizes are also considerably smaller than they actually are. In addition, it is assumed that the second aggregated value V2 is normalized at any stage to be a value between zero and 1. In the shown example, the first partial area set PA1 is a set of first grids composed of 16 pixels, the second partial area set PA2 is a set of second grids composed of 9 pixels, and the third partial area set PA3 is a set of third grids composed of four pixels. Since the second aggregated value V2 is set for a grid in which a plurality of pixels are bundled, the second addition unit 158 expands the second aggregated value V2 set in the grid to all the pixels in the grid, and then adds pixel values of the pixels between the partial area sets to generate the extraction target data PT. There may be a partial area set in which pixels and grids have a one-to-one correspondence, and, in this case, it is not necessary to expand the second aggregated value V2 for each pixel. An example in which a size of a grid is 16 pixels, 9 pixels, or 4 pixels is shown, but when the pattern 2 or the pattern 4 described above is adopted as the method of calculating the difference in feature amount, it is possible to reduce a calculation load of the statistical values by setting the number of pixels on one side to a power of 2 such that the size of a grid is 4 pixels, 16 pixels, or 64 pixels.

The point of interest extractor 160 extracts a circumscribing rectangle that includes a set of parts of the data PT to be processed in which an added value of the aggregated values is equal to or greater than a threshold value.

As described above, the high-resolution processor 170 performs high-resolution processing on an area obtained by applying only the position of a point of interest to the captured image, and determines whether an object on a road is an object that the vehicle needs to avoid contact with.

A result of the determination by the high-resolution processor 170 is output to the traveling control device 200 and/or the notification device 210. The traveling control device 200 performs automatic brake control, automatic steering control, and the like to avoid contact between an object determined to be a "falling object" (actually, an area on the image) and the vehicle. The notification device 210 outputs an alarm in various methods when time to collision (TTC) between the object determined to be a "falling object" (the same as above) and the vehicle is less than a threshold value.

According to the embodiment described above, it is possible to maintain a high detection accuracy while reducing a processing load by including the acquirer 110 that acquires a captured image of at least a road in the traveling direction of the vehicle, the low-resolution image generator 120 that generates a low-resolution image in which the image quality of the captured image is lowered, the grid definition unit 140 that defines one or more partial area sets, and the extractor 150 that derives an aggregated value obtained by aggregating differences in feature amount between partial areas included in each of one or more partial area sets and the peripheral partial areas, and extracts the point of interest based on the aggregated value.

When it is assumed that the processing performed by the feature amount difference calculator 152 or the aggregation unit 154 is executed for the captured image as it is, there is a concern that the processing load increases as the number of pixels increases, and an operation of the traveling control device 200 or the notification device 210 will not be in time for the approach of a falling object. Regarding this point, the object detection device 100 of the embodiment can detect an object while reducing the processing load by generating a low-resolution image and performing processing.

Furthermore, according to the embodiment, since the grid definition unit 140 defines a plurality of partial area sets so that the number of pixels in the grids differs between the plurality of partial area sets, and the extractor 150 extracts a point of interest by adding an aggregated value for each pixel between the partial area sets, it is possible to improve a robustness of detection performance against a variation in size of a falling object. This is because, when processing is simply performed on a low-resolution image, although there is a concern that the presence of a falling object may not be recognized due to a lowering of the image quality, according to the embodiment, it can be expected that a falling object will appear as a feature amount in a grid of any size using the device described above. From the description above, according to the object detection device 100 of the embodiment, it is possible to maintain a high detection accuracy while reducing the processing load.

Although a form for implementing the present invention has been described above using the embodiment, the present invention is not limited to the embodiment, and various modifications and substitutions can be made within a range not departing from the gist of the present invention.

What is claimed is:

1. An object detection device comprising:
   a storage device which storing a program; and
   a hardware processor,
   wherein the hardware processor executes the program stored in the storage device to:
   acquire a captured image in which a road is captured;
   generate a low-resolution image in which an image quality of the captured image is lowered;
   define a plurality of partial area sets in the low-resolution image, each of the plurality of partial area sets being a set of a plurality of partial areas, the number of pixels in each of the partial areas differing from each other between the plurality of partial area sets;
   derive an aggregated value obtained by aggregating differences in feature amount between the partial areas included in each of the plurality of partial area sets and the peripheral partial areas, and extract a point of interest based on the aggregated value; and
   cause a mobile object to autonomously travel based on a result of determination for an object in the point of interest in the captured image.

2. The object detection device according to claim 1, wherein the hardware processor extracts the point of interest by adding the aggregated value for each pixel between the plurality of partial area sets.

3. The object detection device according to claim 1, wherein the hardware processor derives the aggregated value by aggregating differences in feature amount between the partial areas included in each of the plurality of partial area sets and the other partial areas adjacent vertically, horizontally, and diagonally.

4. The object detection device according to claim 3, wherein the hardware processor further adds a difference in feature amount between the partial areas vertically adjacent, a difference in feature amount between the partial areas horizontally adjacent, and a difference in feature amount between the partial areas diagonally adjacent for the partial areas included in each of the plurality of partial area sets to the aggregated value.

5. The object detection device according to claim 1, wherein the hardware processor determines whether the object on a road is an object that the mobile object needs to avoid contact with by performing high-resolution processing on the point of interest in the captured image.

6. An object detection method executed using a computer comprising:
   acquiring a captured image in which a road is captured;
   generating a low-resolution image in which an image quality of the captured image is lowered;
   defining a plurality of partial area sets in the low-resolution image, each of the plurality of partial area sets being a set of a plurality of partial areas, the number of pixels in each of the partial areas differing from each other between the plurality of partial area sets;
   deriving an aggregated value obtained by aggregating differences in feature amount between the partial areas included in each of the plurality of partial area sets and the peripheral partial areas, and extracting a point of interest based on the aggregated value; and
   causing a mobile object to autonomously travel based on a result of determination for an object in the point of interest in the captured image.

7. A computer-readable non-transitory storage medium that has stored a program causing a computer to:
   acquire a captured image in which a road is captured;
   generate a low-resolution image in which an image quality of the captured image is lowered;
   define a plurality of partial area sets in the low-resolution image, each of the one or more plurality of partial area sets being a set of a plurality of partial areas, the number of pixels in each of the partial areas differing from each other between the plurality of partial area sets;

derive an aggregated value obtained by aggregating differences in feature amount between the partial areas included in each of the plurality of partial area sets and the peripheral partial areas, and extract a point of interest based on the aggregated value; and cause a mobile object to autonomously travel based on a result of determination for an object in the point of interest in the captured image.

\* \* \* \* \*